(12) United States Patent
Shamshidov et al.

(10) Patent No.: US 7,134,939 B2
(45) Date of Patent: Nov. 14, 2006

(54) METHOD FOR REDUCING WEAR OF MECHANICALLY INTERACTING SURFACES

(75) Inventors: Boris Shamshidov, Haifa (IL); Alexander Ignatovsky, Haifa (IL)

(73) Assignee: Fricso Ltd., Tirat Hakarmel (IL)

( * ) Notice: Subject to any disclaimer, the term of this patent is extended or adjusted under 35 U.S.C. 154(b) by 221 days.

(21) Appl. No.: 10/655,312

(22) Filed: Sep. 5, 2003

(65) Prior Publication Data
US 2005/0054276 A1   Mar. 10, 2005

(51) Int. Cl.
*B24B 1/00* (2006.01)
(52) U.S. Cl. .............................. 451/36; 451/37; 451/56
(58) Field of Classification Search .................. 451/36, 451/37, 56, 57, 59
See application file for complete search history.

(56) References Cited

U.S. PATENT DOCUMENTS

| | | | |
|---|---|---|---|
| 4,036,906 A * | 7/1977 | Finelli .......................... 528/61 |
| 5,591,068 A * | 1/1997 | Taylor .......................... 451/104 |
| 2003/0003857 A1* | 1/2003 | Shimagaki et al. ......... 451/534 |
| 2004/0116058 A1* | 6/2004 | Meissner .................... 451/541 |
| 2005/0101232 A1* | 5/2005 | Meissner .................... 451/278 |

* cited by examiner

*Primary Examiner*—M. Rachuba
(74) *Attorney, Agent, or Firm*—Mark M. Friedman

(57) ABSTRACT

The invention is about reducing friction and wear and risk of seizure of mechanically interacting lubricated surfaces. A working surface of a mechanical piece engaged with another piece in relative sliding movement is processed for reduced friction. Two distinctly separate zones are allocated on the surface, one attractive to a lubricant used and the other repelling to the lubricant. The repellency may be conveyed to the repelling zone by either a mechanical modifying process or by a chemical change. In a preferred embodiment of the invention the repellency is obtained by lapping. The lubricant attractive layers are associated in a preferred embodiment of the invention with an assembly of recessed microstructures.

31 Claims, 12 Drawing Sheets

METHOD FOR REDUCING WEAR OF MECHANICALLY INTERACTING SURFACES

FIELD OF THE INVENTION

The present invention relates generally to tribology. More specifically the present invention is in the field of contact mechanics. Most aspects of the invention are about reducing wear and risk of seizure of interacting surfaces, and the friction force between them.

BACKGROUND OF THE INVENTION

In order to reduce friction and wear in mechanically interacting surfaces a lubricant is introduced to the zone of interaction. As described schematically in FIG. 1A to which reference is now made, under ideal lubricating conditions, the lubricant film 20 between the surfaces 32 and 34, moving at relative velocity V, forms an intact layer which permits the moving surfaces to interact with the lubricant. Under such conditions, no contact between the Interacting surfaces 32 and 34 occurs at all, the lubricant layer is said to carry the load P existing between the interacting layers. If the supply of lubricant is insufficient, a reduction in the effectivity of the lubrication ensues, which allows surface to surface interactions to occur.

As described schematically in FIG. 1B to which reference is now made, below a certain level of lubricant supply, the distance between the moving surfaces 32 and 34 diminishes because of load P, the asperities of the surfaces, which are the peaks of surface material protruding from the surfaces, may mutually interact. Thus, for example, the asperity 36 of surface 34 of a machine part, can form physical contact and interact with the asperity 38 of surface 32. The asperities of surfaces 32 and 34 carry all of the load existing between the interacting surfaces. In such a condition, often referred to as boundary lubrication, the lubricant is ineffective and the friction and wear are high.

SUMMARY OF THE INVENTION

In accordance with the invention a working surface of a mechanical piece engaged with another piece in relative sliding movement is processed for reduced friction. Two distinctly separate zones are allocated on the surface, one attractive to a lubricant used and the other repelling to the lubricant. The terms attractive and repelling may be considered relative to one another.

The repellency may be conveyed to the repelling zone by either a mechanical modifying process or by a chemical change. The repellency obtained mechanically is in a preferred embodiment of the invention by lapping that increases the micro-hardness of the external layer of the surface. The lubricant attractive layers are associated in a preferred embodiment of the invention with an assembly of recessed microstructures.

Chemical coating in another preferred embodiments is used for conveying repellency to portions of the working surface.

Processing of working surfaces in accordance with the present invention reduces friction and wear of interactive sliding surfaces, and prolongs their life. For engines, the processing of sliding parts in accordance with the invention increases the efficiency by reducing waste of power on friction.

DETAILED DESCRIPTION OF THE PRESENT INVENTION

Figure 1A:
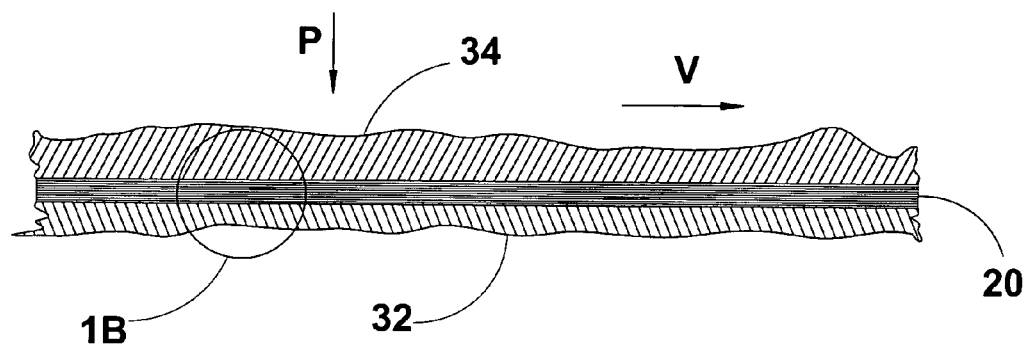
FIG. 1A is a schematic description of the mechanically interacting surfaces with lubricating layer interposed.
Figure 1B:
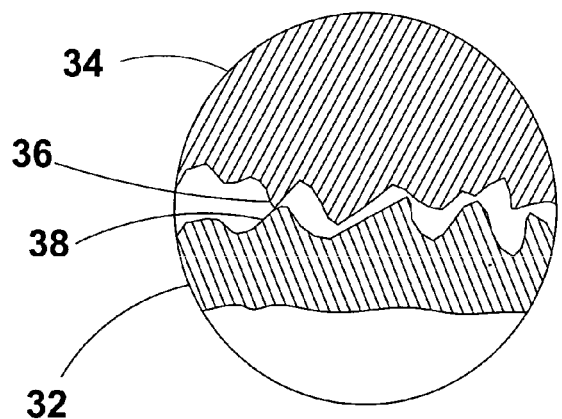
FIG. 1B is a schematic description of mechanically interacting surfaces with interacting asperities.
Figure 2:
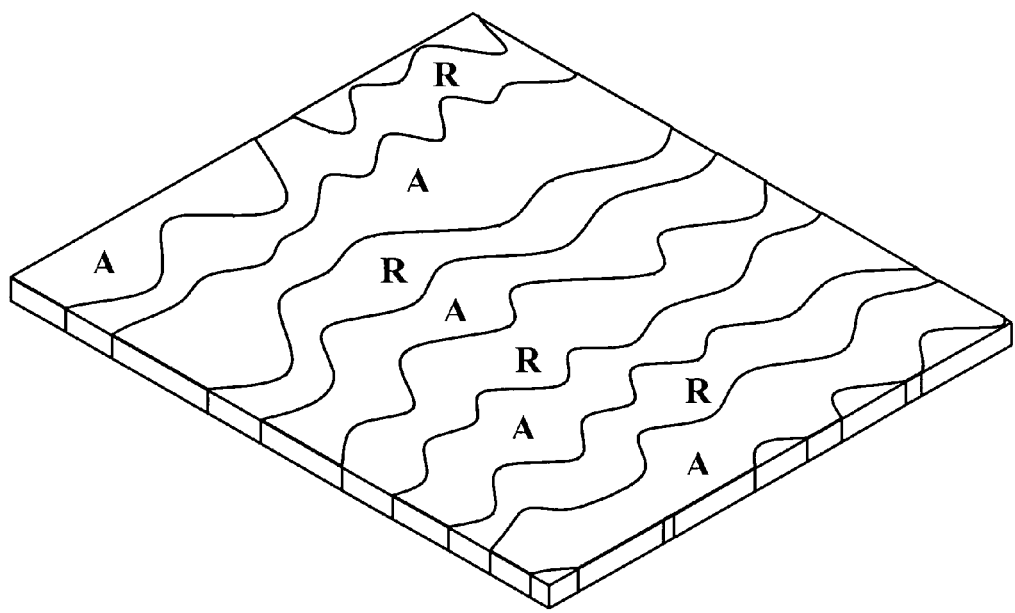
FIG. 2 is a description of a generalized concept of the invention.

In accordance with the present invention, lubricated surfaces in relative sliding motion are treated to produce less wear and friction in the course of interaction. In most general terms, the process of the invention to the invention, transforms a working surface, forming two zones, one having a high degree of lubricant repellence, and the other having a relative attraction towards the lubricant. The two zones are interposed as will be described later on. One zone constitutes an assembly of well distributed structures on the working surface, having a more pronounced attraction towards the lubricant. A schematic representation of the concept of the invention is shown in FIG. 2 to which reference is now made. A schematic working surface is shown which is composed of a combination of zones. The zones marked A are lubricant attractive and the zones marked R are relatively lubricant repelling.

Figure 3A:
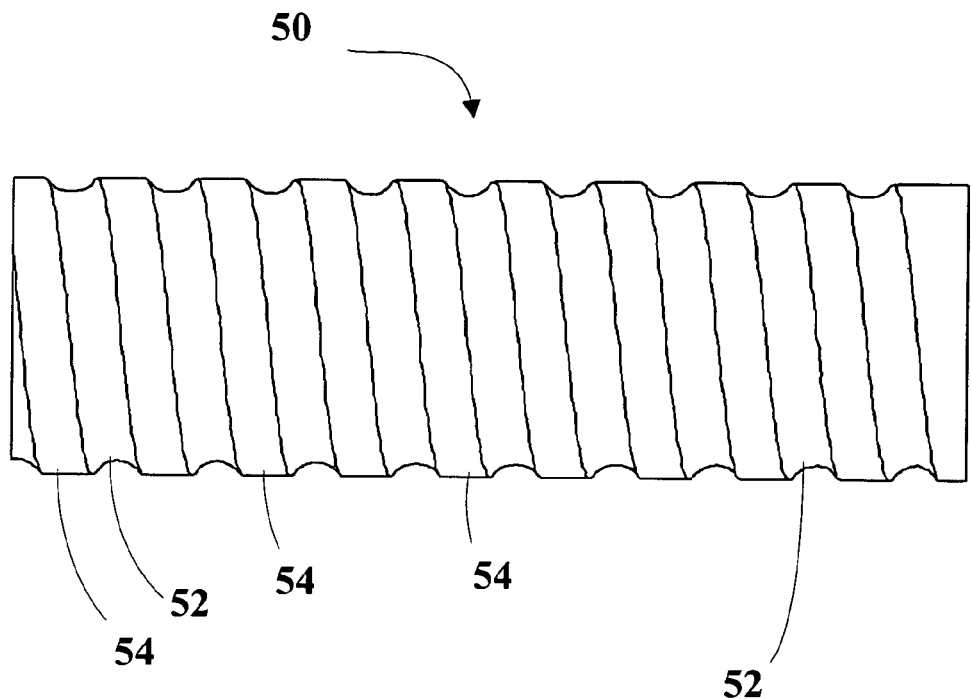
FIG. 3A is a schematic description of a grooved cylinder in accordance with the present invention.
Figure 3B:
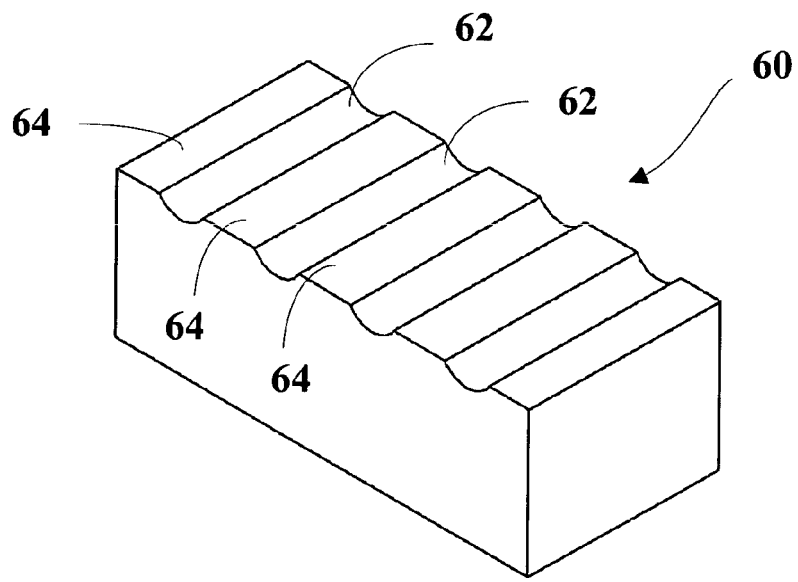
FIG. 3B is a schematic description of a metal plate the working surface of which is grooved in accordance with the invention.

In a preferred embodiment of the invention, the difference between the zones with respect to attraction to the lubricant is associated with a structural difference. The structural aspects of the system of this embodiment of the invention are schematically described in reference to FIGS. 3A–B. In FIG. 3A a cylinder 50 has its surface structured such that one or more grooves, such as helical groove 52 typically between 5–30 μm deep at peak, and about 100–1000 μm wide are engraved on the surface. The remainder of the original surface is one or more ridges, in this example a helical ridge 54. The exterior of cylinder 50 is therefore comprised of two zones, the superficial zone which includes the ridges, and the recessed zone which includes the grooves. In FIG. 3B a flat slab of metal 60 is described schematically, showing its working surface engaged in frictional interaction with another element and is processed in accordance with the present invention. Thus grooves 62, the assembly of which become the recessed zone, alternate with ridges 64 forming the superficial zone of the working surface of the slab.

Zone Patterns

Figure 4A:
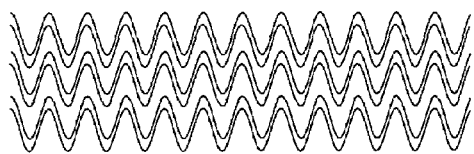
FIG. 4A is a pattern of dense sinusoidal grooving in accordance with an embodiment of the invention.
Figure 4C:
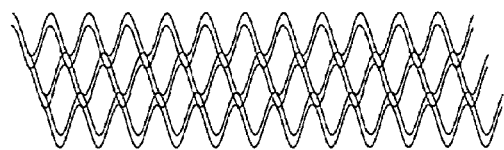
FIG. 4C is a sinusoidal pattern of grooving, containing over lapping sinuses in accordance with an embodiment of the invention.
Figure 4B:
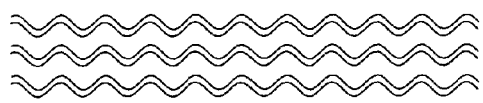
FIG. 4B is a pattern of sinusoidal grooving in accordance with an embodiment of the invention.
Figure 4D:
FIG. 4D is a pitted pattern of grooving in accordance with an embodiment of the invention.
Figure 4E:
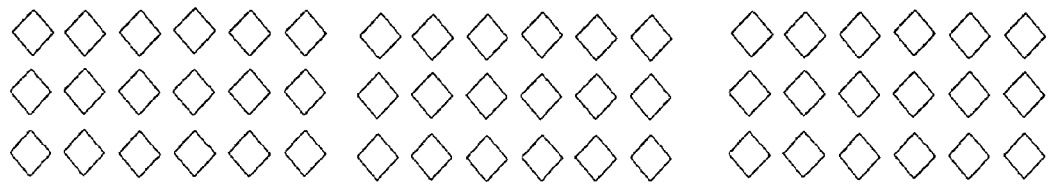
FIG. 4E is a pattern of rhomboidal grooving in accordance with an embodiment of the invention.
Figure 4F:
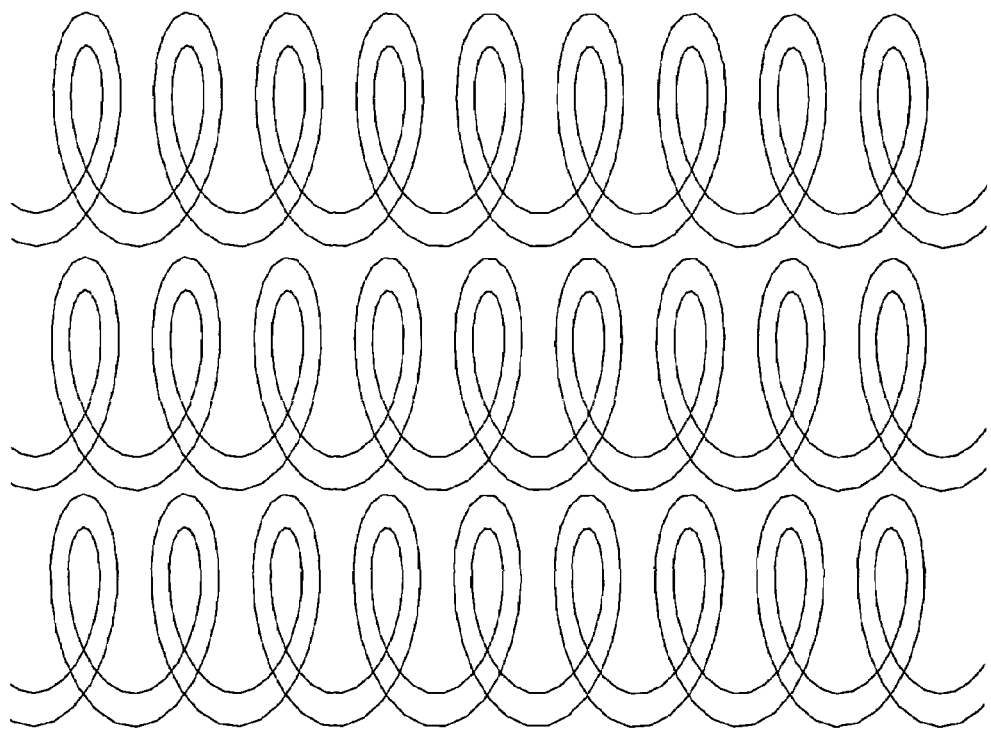
FIG. 4F is a pattern of helical grooving in accordance with an embodiment of the invention.

A explain above, one preferred embodiment of the invention employs recesses as lubricant attracting and superficial ridges as lubricant repelling zones. In FIGS. 4A–4F exemplary patterns of recesses such as microgrooves and other structures are described schematically, which can comply with the structural aspects of embodiments of the present invention. In FIG. 4A a dense sinusoidal pattern is described, in FIG. 4B a sinusoidal pattern is described, and in FIG. 4C the sinusoidal pattern contains overlapping sinuses. In FIG. 4D a pitted pattern is described. In FIG. 4E a pattern of rhomboids is described, and in FIG. 4F a pattern of helixes is described. The diversity of optional patterns is very large, and the examples given above constitute only a representative handful.

Processing the Working Surface

The processing required in order to attain the increased performance in accordance with the present invention involves forming a compound surface possessing lubricant attractive zones and lubricant repelling zones. In a preferred embodiment of the invention, the zone with a reduced attraction to a lubricant is a superficial zone of the working surface. This can be achieved either by mechanically processing the working surface per se or by coating the superficial zone with a lubricant-repelling coat.

Figure 5:
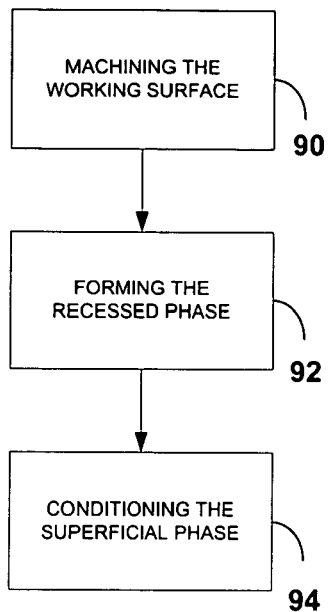
FIG. 5 is a flow chart of the process of conditioning a working surface in accordance with one embodiment of the invention employing recessed zones.
Figure 6A:
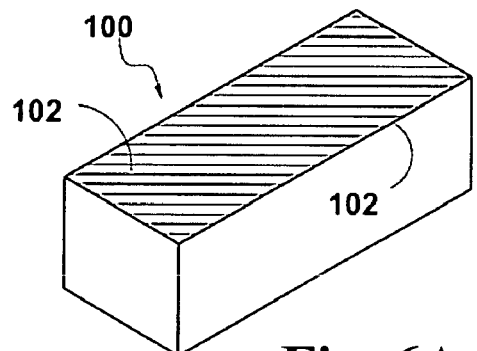
FIG. 6A is schematic description of an interacting surface of the invention.
Figure 6B:
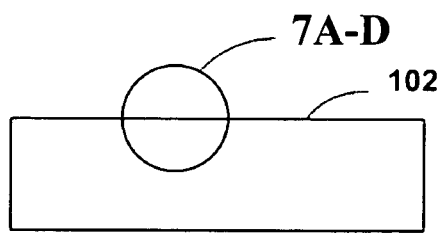
FIG. 6B is a schematic description of a side view of the interacting surface of FIG. 6A.
Figure 7A:
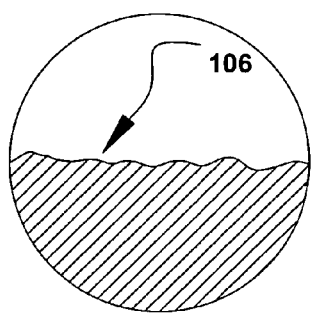
FIG. 7A is a cross sectional schematic description of a pre-machined surface.
Figure 7B:
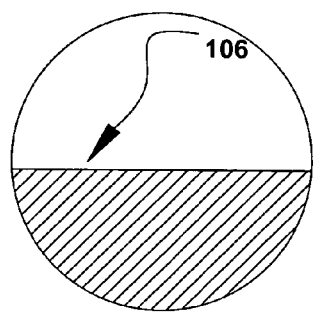
FIG. 7B is a cross sectional schematic description of a the leveled surface.
Figure 7C:
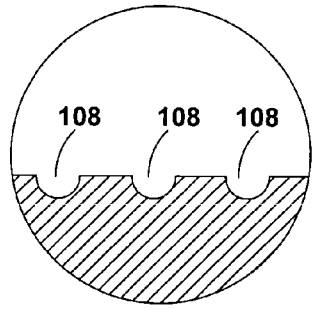
FIG. 7C is a cross sectional schematic description of a leveled surface with micro-grooves formed.
Figure 7D:
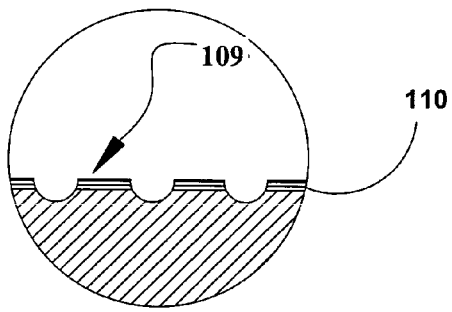
FIG. 7D is a cross sectional schematic description of a grooved surface with conditioned ridges.
Figure 8A:
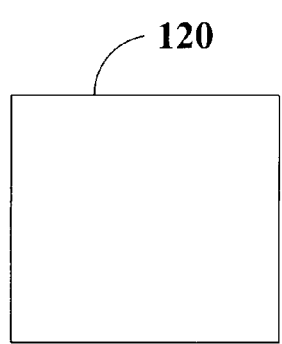
FIG. 8A is a cross sectional schematic description of a working surface of the invention prior to processing.
Figure 8B:
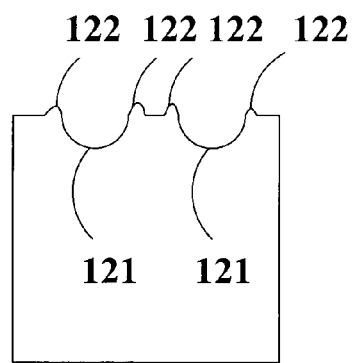
FIG. 8B is a cross sectional schematic description of a formed microgrooves with bulges.
Figure 8C:
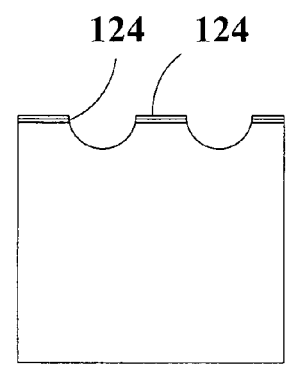
FIG. 8C is a cross sectional schematic description of a leveled micro grooved surface after application of lapping.

In some embodiments, mechanical processing of a working surface for the purpose of conveying particular frictional properties in accordance with the invention requires also changing the relief of the working surface. In a preferred process for conditioning the working surface, according to one embodiment, described schematically in FIG. 5 to which reference is now made, forming a recessed zone and conditioning the superficial zone take place in the following order. In step 90 the working surface is machined by abrading or lapping for obtaining a high degree of flatness and surface finish. In step 92 the recessed zone is formed as will be explained later on, and in step 94, conditioning of the superficial zone takes place. Lapping is a suitable, preferred technique for such conditioning of the superficial zone. Lapping can achieve a very good flatness rating, and very good finish. The lapping technique uses free flowing abrasive material, as compared to grinding which uses fixed abrasives. FIG. 6A describes schematically an interacting surface 100, the working surface 102 of which is to be processed in accordance with an embodiment of the invention. A schematic sectional view of the surface is shown in FIG. 6B, indicating the position of an enlarged view of the cross section shown in FIGS. 7A–D, to which reference is now made. In FIG. 7A the pre-machined surface 106 is shown. In FIG. 7B the machined surface is shown leveled. In FIG. 7C surface 106 is shown after microgrooves 108 have been formed. In the next step, as shown in FIG. 7D, the working surface has been transformed, to convey lubricant-repelling properties to the superficial zone 109. A new layer has formed within the superficial zone, this layer designated schematically by the number 110. The reason that the lapping step comes after the microgroove production stage is that forming the recessed microstructures on the surface may cause bulges to appear. Such bulges may appear even if the structural changes are made by laser cutting. This is described in FIGS. 8A–B to which reference is now made. In FIG. 8A cross section in the working surface is schematically represented by line 120. In FIG. 8B microgrooves 120 are formed, accompanied by bulges 122. In FIG. 8C the superficial zone has been processed by lapping, leveling off the bulges and producing the plastically deformed layer 124, which is lubricant-repelling. If the micro-relief forming step does not effect the form and properties of the superficial zone, it can take place last.

Figure 9A:
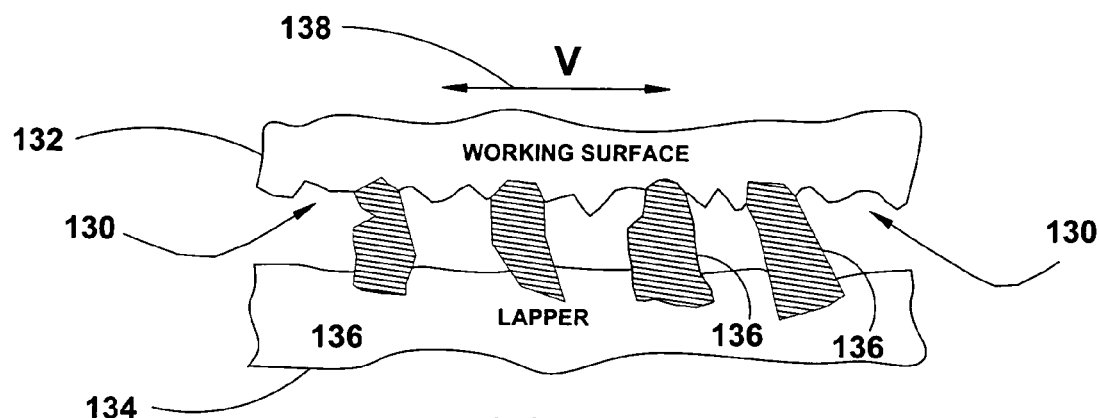
FIG. 9A is a cross sectional schematic description of a lapper-working surface interface prior to application of lapping.
Figure 9B:
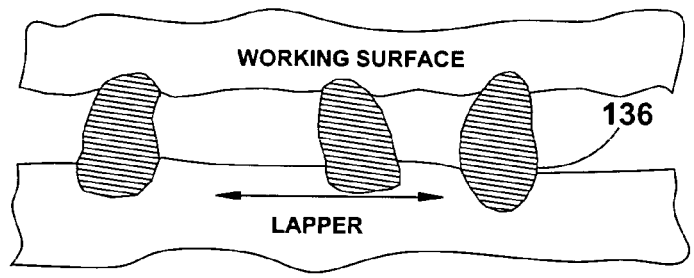
FIG. 9B is a cross sectional schematic description of the lapper working surface condition after lapping has progressed.

As mentioned above, lapping is a preferred mechanical finishing method for obtaining the characteristics of the working surface of the mechanical part in accordance with the present invention. The lapping incorporates a lapper, the surface of which is softer than the working surface of the processed mechanical part. The abrasive grit must be much harder than the face of the lapper, and harder than the processed working surface. It is essential that the abrasive grit is not too hard or brittle, thus diamond grit is not to be used in the lapping of the invention. Aluminum oxide was found to be a good choice of grit for lapping in accordance with the invention. In FIGS. 9A–B to which reference is now made, are described schematically progressive steps in the lapping which promote the conditioning of the working surface in accordance with the present invention. The initial condition is described schematically in the microscopic level in FIG. 9A. The irregular topography 130, of the working surface 132 faces the lapper 134 and is separated by an irregular distance from it. Abrasive grit particles 136 and others are partially sunken in the lapper 134, and to a lesser extent in working surface 132. Both the working surface and the lapper are made to move in a relative motion designated by arrow 138. This motion has an instantaneous magnitudes V. In FIG. 9B, some lapping action has taken place, causing the surface 130 to become less irregular. As a result of the relative movement between the surfaces, the grit particles such as particle 136 are now rounded to some extent, losing some of their edges in the course of rubbing against the surfaces. As the process continues, no more stock is removed from the processed part. The lapping now can bring about a plastic deformation in the outer surface of the working surface, increasing its micro-hardness. A thin, hard layer covers the working surface. This thin skin layer is associated with the repellence property of the lubricant.

It has been found that coating the lapper with a thin, such as for example 0.05 to 0.4 mm layer of a hard polymer coat, is favourable with respect micro-hardness and lubricant repellence of a conditioned working surface. Suitable materials for the task are organic polymers. It has been found that a mixture of epoxy cement polyurethane at a ratio of about 20:80, is suitable for that purpose. In this mixture, the epoxy provides the adhesion to the metal working surface whereas the polyurethane provides the toughness and hardness. The mechanical criteria with which such a coat should comply with are high toughness and elasticity.

Figures 10A, 10B, 10C:
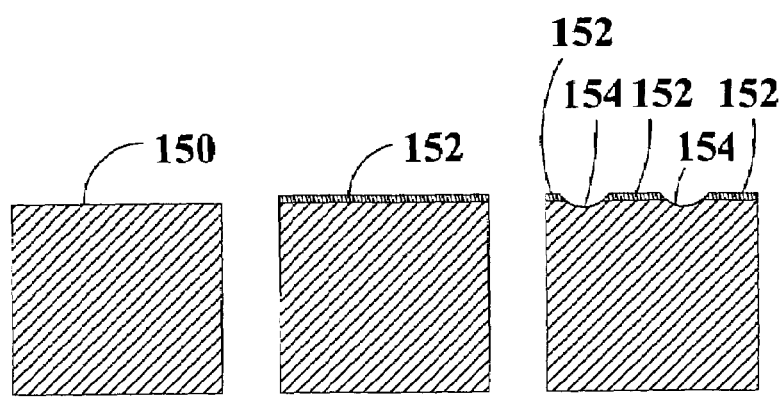
FIG. 10A is a cross sectional schematic description of a pre coated surface.
FIG. 10B is a cross sectional schematic description of the coated surface of FIG. 10A.
FIG. 10C is a cross sectional schematic description of the micro-grooves of the surface of FIG. 10B in accordance with an embodiment of the invention.

In a different embodiment of the present invention, a plastic coat is applied on the working surface instead of mechanically conditioning the superficial zone. The working surface is coated with a plastic coating having a set of properties as will be discussed later on. The procedure for coating the working surface includes first covering the working surface with a precursor of the coat. The main stages in the processing of a working surface in accordance with a plastic coating approach of the invention is described in FIGS. 10A–C to which reference is now made. In FIG. 10A the working surface is designated 150. In FIG. 10B, the working surface is shown coated by a plastic coat 152. After the coat is deposited, portions of the coat are removed, by for example forming micro-grooves, as shown schematically in FIG. 10C, indicated by recesses 154. The recesses penetrate right through the plastic coat, reaching into the under-layer. In this example, the ridges 152 constitute a superficial zone, whereas the recesses 154 constitute a recessed zone. The recessed zone is more attractive to the lubricant applied to the working surface then is the superficial zone.

Figure 11:
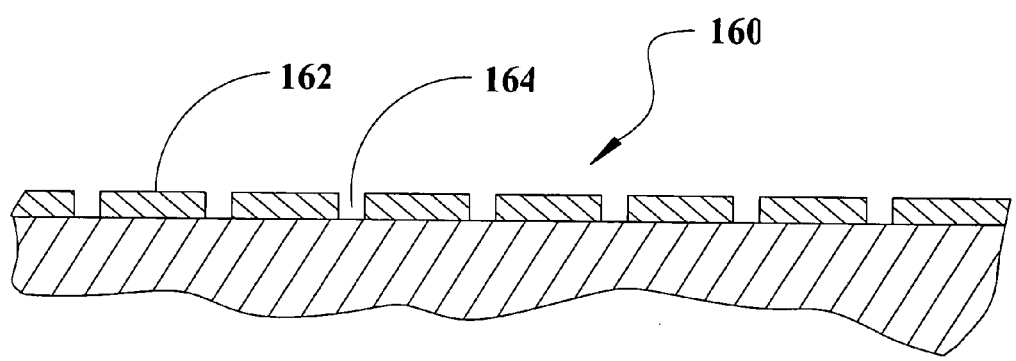
FIG. 11 is a cross sectional schematic description of an working surface covered by a pitted plastic cover in accordance with an embodiment of the invention.

In another embodiment of the invention, working surface is preprocessed by grinding. Then the surface is coated by a layer of lubricant repelling tape, containing holes. This is described schematically in FIG. 11 to which reference is now made. Working surface 160 is covered with a plastic perforated sheet 162 in which holes such as hole 164 are punched in advance of coating.

Forming the Recessed Zone

As discussed above, in some embodiments of the present invention, the zones formed on the working surface in accordance with the present invention is associated with the formation of micro-relief on the working surface. As discussed above, the recessed zone is usually associated with a relative attraction for lubricant. In order to form the recessed zone, the working surface is micro-structured to obtain an assembly of recesses. This can be achieved by any one or more methods known in the art. Mechanical cutting, laser engraving, and chemical etching are such methods. Methods for producing regular micro-relief in mechanical parts is described in Tribotest Journal 4-2, December 1997, (4), 159, "A Disc on Flat Wear Test Under Starved Lubrication" by Levitin M. and Shamshidov B. The contents of which are incorporated herewith by reference.

Experiments

Figure 12:
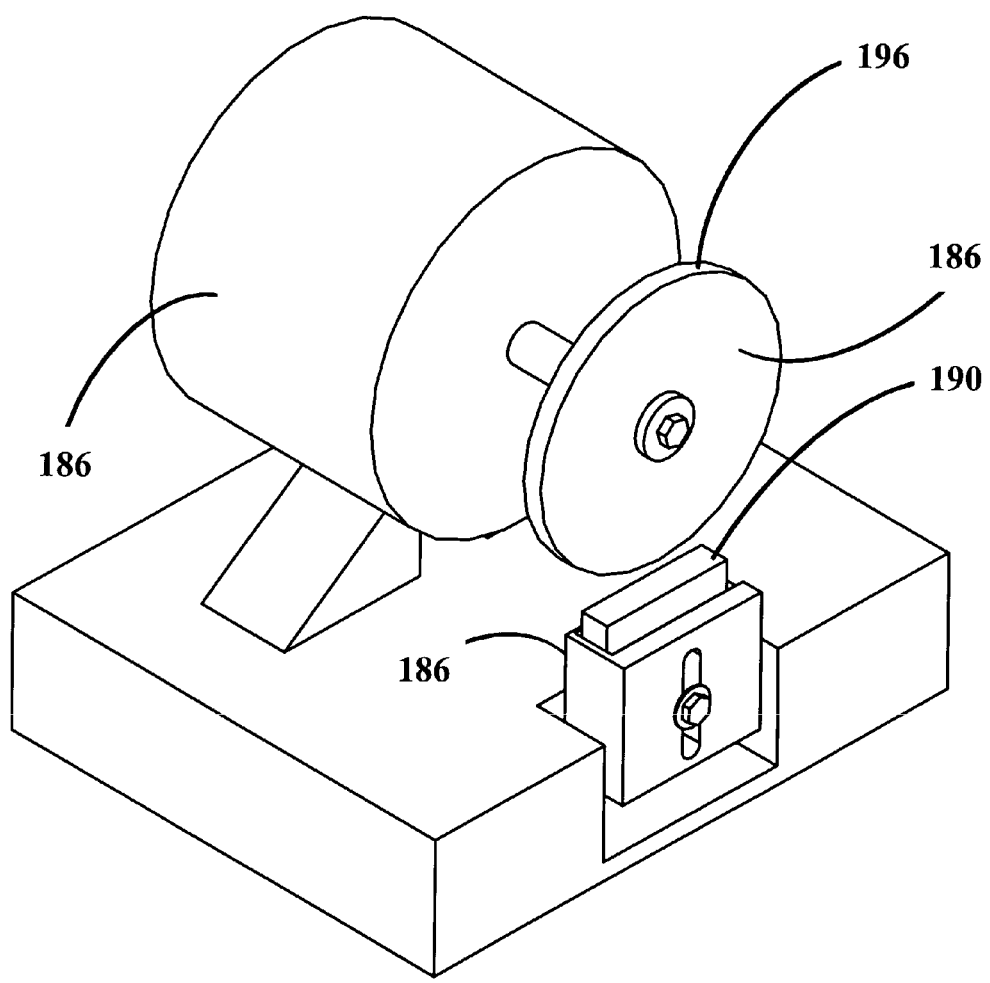
FIG. 12 is an isometric schematic description of an experimental set-up for testing discs conditioned in accordance with the invention.

The experimental set-up is described schematically in FIG. 12 to which reference is now made. An interchangeable set of carbon steel disks of 30 mm diameter (made of carbon steel grade 1045 (HRC=27–30)), such as disc 186 rotatable around an axle, was made to rotate against a flat counter plate 190 for measuring wear. Electrical motor or gear 190 supplied the torque for the rotation. The counter plate 192 was made of copper alloy (UNS C93700 (HRC=22–24) and was ground to Ra=0.0004 mm finish. The plate had a support 194, having an adjustable height for controlling the force applied on disk 186. The control disks had a conventional grinding finish (Ra=0.0004 mm), whereas the test disks were further treated by micro-grooving face 196 of the disc, and then by lapping, in accordance with the present invention. During the experiments, a permanent load of a 100 N was applied to the disc in the direction of the counter plate 190. One drop of oil (Amoco industrial Oil 32), was applied to the dry friction surface before the motor was activated to a constant rotation rate of 250 rpm. The time to seizure which is the accumulated time from start of turning to the time in which movement stopped by seizure, was measured. The results were as follows 16–18 minutes for the control (ground) disk. The disk treated by micro-grooving and lapping, continued to revolve without stopping for a period above 40 hours.

In another experiment the disk rotated a rate of 180 rpm. Control disks were subjected to finishing by grinding, in another group, the disks were subjected to micro-grooving, whereas a third group of disks were subjected to micro-grooving and to lapping (group c). The results of a one-drop test are given in the table. Calculated were: coefficient of friction, path of the disc in KM until seizure, and intensity of wear, measured by peak depression formed on the counter plate as a result of the friction with the disc.

TABLE 1

Results of tests incorporating disk rolling against counter plate.

| Surface treatment of disc | Calculated path until seizure in Km) | Coefficient of friction | Intensity of wear (in mm³/Km). |
|---|---|---|---|
| Grinding | 1.5 | 0.1–0.2 | 0.2 |
| Grinding + micro-grooving | 8.7 | 0.08–0.12 | 0.02 |
| Grinding + micro-grooving + lapping | At least 29.7 | 0.03–0.04 | 0.001 |

Benefits of Applying the System of the Invention

Applying the method of the invention to mechanical part engaged in frictional forces reduces friction and wear, risk of seizure, and prolongs operative life of such parts.

Punching: the process of the invention applied to punches and matrices, providing better quality surface of the processed part, and reduction of up to 30% power.

Internal combustion engines: the method of the invention was applied to 120 mm cylinder sleeves of diesel engines and to 108 mm diameter motorcycle engines. The results of tests carried out with the products of the invention as compared to conventional sleeves show: lower fuel consumption was better for equal performance, longer lifetime obtained, and less oil loss occurred.

The invention claimed is:

1. A method of conditioning a metal working surface of a load-bearing mechanical part, so as to produce a metal, load-bearing working surface, the method comprising the steps of:
   (a) providing a system including:
      (i) a metal workpiece having the metal working surface;

(ii) a contact surface, disposed generally opposite said working surface, (iii) a plurality of abrasive particles, said particles freely disposed between said contact surface and said working surface;

(b) exerting a load on said contact surface and said working surface, such that at least a portion of said abrasive particles are in contact both with said contact surface and said working surface, and (c) lapping said workpiece by applying a relative motion between said working surface and said contact surface, said contact surface including at least one elastic, polymeric material, said polymeric material and said abrasive particles being selected so as to (i) effect an at least partially elastic interaction between said contact surface and said abrasive particles, such that at least a portion of said abrasive particles penetrate said working surfaces and embed at least a portion of said abrasive particles in said contact surface, so as to produce the metal, load-bearing working surface.

2. The method of claim 1, further comprising the step of:

(d) abrading said working surface to improve flatness of said working surface, wherein said abrading takes place prior to said lapping.

3. The method of claim 1, further comprising the step of:

(d) applying microrelief to said working surface to produce at least one recess.

4. The method of claim 3, wherein step (d) is performed prior to said lapping.

5. The method of claim 1, wherein said abrasive particles include alumina particles.

6. The method of claim 1, wherein said polymeric material includes at least one organic polymer.

7. The method of claim 6, wherein said organic polymer includes an epoxy material.

8. The method of claim 6, wherein said organic polymer includes polyurethane.

9. The method of claim 6, wherein said organic polymer includes an epoxy material and polyurethane.

10. The method of claim 9, wherein a ratio of said epoxy material to said polyurethane is about 20 to 80.

11. The method of claim 6, wherein said at least one organic polymer is selected so as to provide said contact surface with toughness and elasticity so as to effect said at least partially elastic interaction.

12. The method of claim 6, wherein said at least one organic polymer is selected so as to effect a plastic deformation in said working surface of said metal workpiece.

13. The method of claim 1, wherein said metal workpiece is a steel workpiece.

14. The method of claim 1, wherein said metal work surface is a steel work surface.

15. The method of claim 6, wherein said at least one organic polymer is selected so as to effect a plastic deformation in said metal working surface of said metal workpiece so as to increase a microhardness of said metal working surface.

16. The method of claim 1, further comprising the step of:

(d) incorporating said metal working surface in a mechanical part that engages frictional forces.

17. The method of claim 1, further comprising the step of:

(d) incorporating said metal working surface as a load-bearing surface in an internal combustion engine.

18. A method comprising the steps of (a) providing a system including:

(i) a metal workpiece having a metal, load-bearing working surface;

(ii) a contact surface, disposed generally opposite said working surface, (iii) a plurality of abrasive particles, said particles freely disposed between said contact surface and said working surface;

(b) exerting a load on said contact surface and said working surface, such that at least a portion of said abrasive particles are in contact both with said contact surface and said working surface;

(c) lapping said workpiece by applying a relative motion between said working surface and said contact surface, said contact surface including at least one polymeric material, said polymeric material and said abrasive particles being selected so as to (i) effect an at least partially elastic interaction between said contact surface and said abrasive particles, such that at least a portion of said abrasive particles penetrate said working surface, and (ii) embed at least a portion of said abrasive particles in said contact surface;

and, subsequently to step (c), the method further comprising the steps of:

(d) disposing said metal working surface generally opposite a second surface, wherein said metal working surface and said second surface are for bearing a load;

(e) disposing a lubricant therebetween;

(f) exerting said load between said second surface and said working surface, and (g) applying a relative motion between said second surface and said contact surface.

19. The method of claim 18, wherein said polymeric material includes an epoxy material.

20. The method of claim 18, wherein, in steps (d)–(g), wherein said metal working surface is incorporated in an internal combustion engine.

21. A method comprising the steps of:

(a) providing a system including:

(i) a metal workpiece having a metal, load-bearing working surface;

(ii) a contact surface, disposed generally opposite said working surface, (iii) a plurality of abrasive particles, said particles freely disposed between said contact surface and said working surface;

(b) exerting a load on said contact surface and said working surface, such that at least a portion of said abrasive particles are in contact both with said contact surface and said working surface;

(c) lapping said workpiece by applying a relative motion between said working surface and said contact surface, said contact surface including at least one polymeric material, said polymeric material and said abrasive particles being selected so as to (i) effect an at least partially elastic interaction between said contact surface and said abrasive particles, such that at least a portion of said abrasive particles penetrate said working surface, and (ii) embed at least a portion of said abrasive particles in said contact surface;

and, subsequently to step (c), the method farther comprising the step of:

(d) incorporating said metal working surface in a mechanical part designed for engaging frictional forces.

22. The method of claim 21, wherein said mechanical part is disposed in an internal combustion engine.

23. The method of claim 22, wherein said mechanical part is a cylinder sleeve of said internal combustion engine.

24. The method of claim 21, wherein said polymeric material includes polyurethane.

25. The method of claim 21, wherein said polymeric material includes an epoxy material.

26. The method of claim 21, wherein said polymeric material includes an epoxy material and polyurethane.

27. A method of conditioning a working surface of a mechanical part, the method comprising the steps of:

(a) providing a system including:
  (i) a metal workpiece having a metal working surface;
  (ii) a contact surface, disposed generally opposite said working surface,
  (iii) a plurality of abrasive particles, said particles freely disposed between said contact surface and said working surface;

(b) exerting a load on said contact surface and said working surface;

(c) lapping said workpiece by applying a relative motion between said working surface and said contact surface, said contact surface including at least one polymeric material, said polymeric material and said abrasive particles being selected so as to
  (i) effect an at least partially elastic interaction between said contact surface and said abrasive particles, such that at least a portion of said abrasive particles penetrate said working surface, and
  (ii) embed at least a portion of said abrasive particles in said contact surface;

(d) applying microrelief to said working surface to produce at least one recess.

28. The method of claim 27, wherein step (d) is performed prior to said lapping.

29. The method of claim 27, wherein said polymeric material includes at least one organic polymer.

30. The method of claim 29, wherein said organic polymer includes an epoxy material.

31. The method of claim 29, wherein said organic polymer includes an epoxy material and polyurethane.

* * * * *

UNITED STATES PATENT AND TRADEMARK OFFICE
CERTIFICATE OF CORRECTION

| | | |
|---|---|---|
| PATENT NO. | : 7,134,939 B2 | Page 1 of 1 |
| APPLICATION NO. | : 10/655312 | |
| DATED | : November 14, 2006 | |
| INVENTOR(S) | : Boris Shamshidov and Alexander Ignatovsky | |

It is certified that error appears in the above-identified patent and that said Letters Patent is hereby corrected as shown below:

Claim 1, column 7 should be corrected as follows:

Line 19: insert "(ii)" before "embed at least…".

Signed and Sealed this

Third Day of April, 2007

JON W. DUDAS
*Director of the United States Patent and Trademark Office*